(Model.)　　　　　　　　　　　　　　　　2 Sheets—Sheet 1.
W. H. BRUNING.
COFFEE ROASTER.
No. 310,026.　　　　　　　　Patented Dec. 30, 1884.
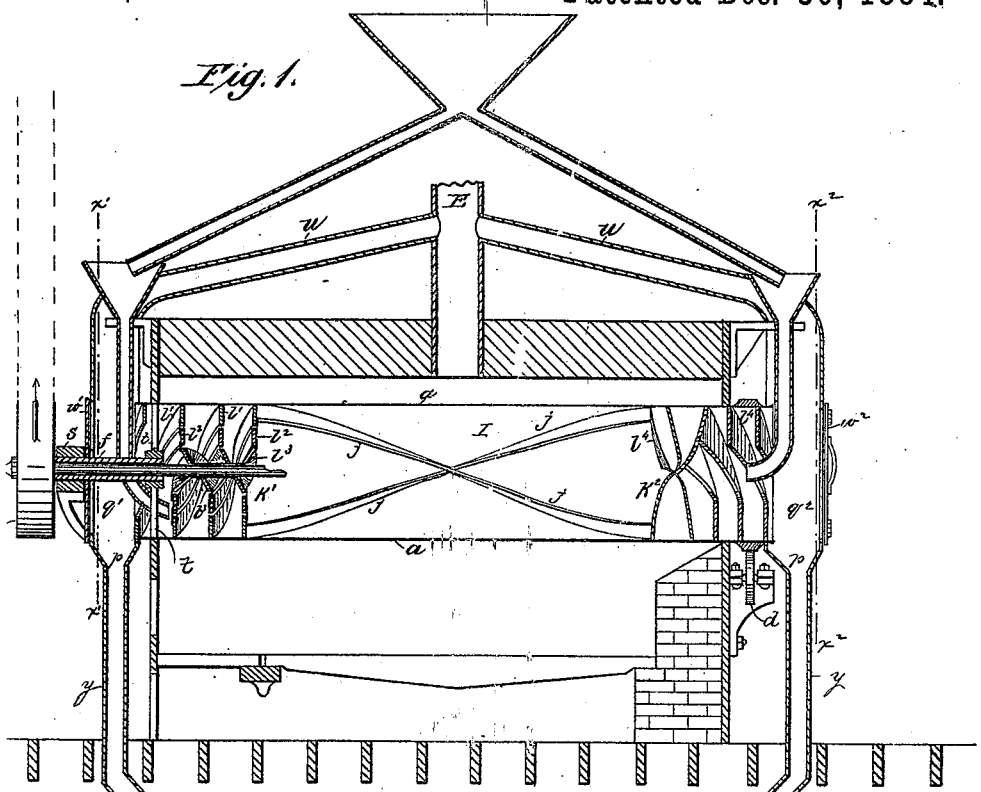
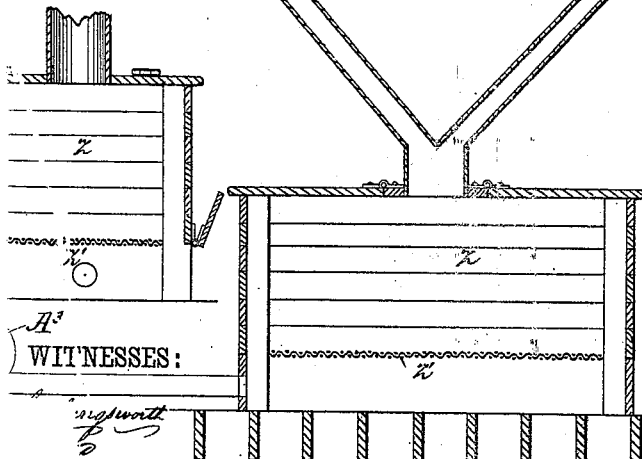
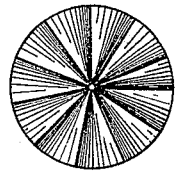
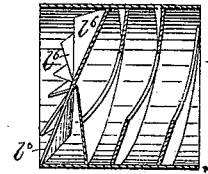
WITNESSES:
INVENTOR:
Wm. H. Bruning
BY
ATTORNEY (No Model.) 2 Sheets—Sheet 2.
W. H. BRUNING.
COFFEE ROASTER.
No. 310,026. Patented Dec. 30, 1884.
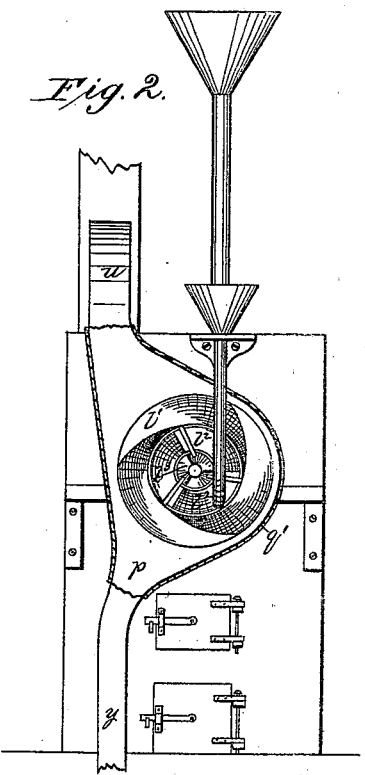
Fig. 2.
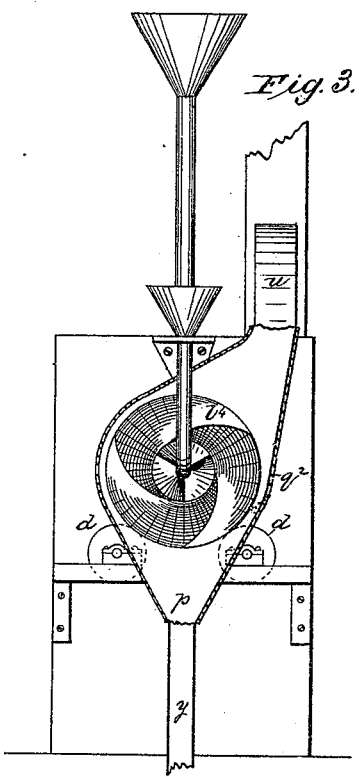
Fig. 3.
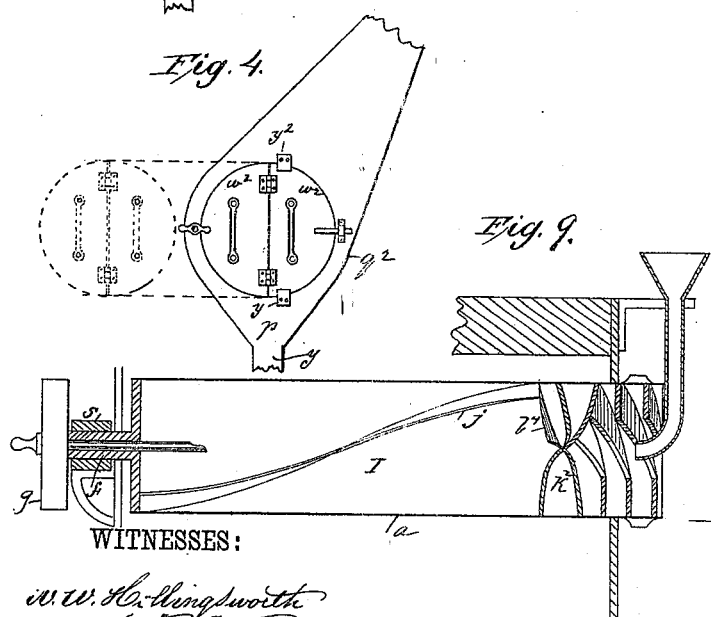
Fig. 4.
Fig. 9.
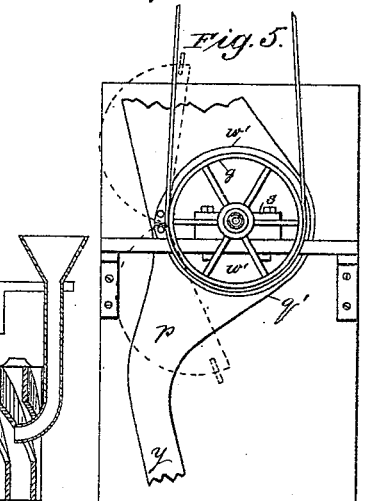
Fig. 5.
WITNESSES:
INVENTOR:
Wm. H. Bruning
BY Munn & Co.
ATTORNEYS.

UNITED STATES PATENT OFFICE.

WILLIAM H. BRUNING, OF MADISON, INDIANA.

COFFEE-ROASTER.

SPECIFICATION forming part of Letters Patent No. 310,026, dated December 30, 1884.

Application filed December 31, 1883. (No model.)

*To all whom it may concern:*

Be it known that I, WILLIAM H. BRUNING, a citizen of the United States, residing at Madison, in the county of Jefferson and State of Indiana, have invented certain Improvements in Coffee-Roasters, of which the following is a full, clear, and exact description.

Figure 1 is a longitudinal sectional elevation of my improved coffee-roaster. Fig. 2 is a transverse section of the same on the line $x'$ $x'$ of Fig. 1. Fig. 3 is a transverse section of the same on the line $x^2$ $x^2$ of Fig. 1. Fig. 4 is an outside view of the smoke-breeching $q^2$. Fig. 5 is an outside view of the smoke-breeching $q'$, and Fig. 6 is a cross-section of the receptacle with wire bottom for receiving the roasted coffee. Figs. 7 and 8 are respectively an end view and longitudinal section of that end of the cylinder showing a modification of the spiral flanges, and Fig. 9 is a longitudinal section of a modification of the cylinder.

My invention relates to apparatus for drying and roasting coffee and other articles; and the present machine is designed as an improvement upon the one shown in my application for Letters Patent, Serial No. 88,643, which was allowed on November 5, 1883.

The improvement is designed to increase the capacity and efficiency of the machine for roasting or drying in large quantities. I accomplish this by constructing spiral conveyers within both open ends of a rotating roasting or drying cylinder having a greater length than is usually made, said conveyers at both ends being arranged to convey inwardly the coffee or other material from the feeding-spouts into the intermediate part of the cylinder, and to hold the same therein as long as desired to complete the drying or roasting, or so long as the cylinder is rotated in the same direction. The part I of the cylinder, which is the usual form of a coffee-roaster, is where the coffee or other article is to be contained while drying or roasting, and is provided with spiral flanges $jj$, arranged at any suitable angles with each other, for alternately throwing the coffee inward toward the center and outward toward both ends as the cylinder revolves, for the purpose of agitating and evenly distributing the coffee throughout the cylinder during the operation of roasting. The spiral conveyers at the ends in sections or parts K' and K² are adapted to prevent any of the material within the cylinder from escaping at the open ends, or approaching near to said open ends, until the cylinder is rotated in a reverse direction, whereupon the said spiral conveyers receiving the contents from section I by the flanges $jj$ will quickly discharge the same out of said open ends. By this arrangement of the spiral conveyers within a portion of the open ends I am enabled to dispense with any closing and opening device to said ends.

The spiral conveyers in section K' are shown as composed of three sets of spiral flanges, $l'$, $l^2$, and $l^3$, all conveying in the same direction and filling the entire diameter of the cylinder, excepting a small central part for the trier to pass through. The spiral flanges $l'$ are fastened to the shell of the cylinder $a$, and the spiral flanges $l^2$ to the spirals $l'$, and the spiral flanges $l^3$ again in like manner to the spirals $l^2$.

The spiral conveyers in section K² are shown as composed of spiral flanges $l^4$, either filling the entire diameter of the cylinder, or, as shown in the drawings, a central portion of part of the spiral conveyers may be cut out to permit the inserting of an ordinary hand-scoop to put into the cylinder any material to be dried, like damp flour, &c., which cannot be made to run through a feeding-spout. For the purpose of so filling with a hand-scoop I do not use a central shaft at this end, but support the end upon the anti-friction rollers $d$ $d$, as shown. This form of constructing and manner of supporting the open end may also be adopted, if desired, to construct a small cylinder with only one open end, as shown in Fig. 9, and which shall be capable of performing the full range of work, as described. In that case the end of section I of the cylinder would be closed by a tight head at the end farthest from section K², the said head having a central hollow shaft to support the end, and also to receive the driving-pulley, as shown in my application allowed November 5, 1883.

At the end of section K', I have shown the cylinder supported by a central shaft, $f$, keyed in the hub of spider-frame $t$, which is fastened to the shell of the cylinder $a$, the said shaft being hollow for inserting a trier to test the progress of the roasting or drying; and I also make the shaft to continue beyond the journal-bearing s, to receive a driving-pulley, g, to give the motion to the cylinder. The ends of the cylinder extending through and beyond the furnace walls or plates, which, I am aware, is an old form of construction, and do not claim in itself, are to be inclosed with breechings $q'$ and $q^2$, having the semicircular doors $w'$ $w'$, opening on a peripheral hinge, as shown in Fig. 5, and $w^2$ $w^2$, hinged together diametrically, and adapted to be opened separately or removed entirely by sliding in the cleats $y^2$ in direction of the dotted lines of Fig. 4, the said doors being so arranged for the purpose of access to the cylinder for repairs, or for filling with hand-scoop, as described. The breechings, further, have the hopper-bottoms $p$ $p$ with tube continuations $y$ $y$, for spouting the discharged contents of the cylinder to the story below into the receptacle Z, which is close or air-tight at the sides and top, and has a wire or perforated bottom, Z'. The heat of the coffee or other article in the receptacle Z will cause an upward current of air through the wire bottom Z', and up the tubes $y$ $y$, and through the breechings $q'$ and $q^2$ and tubes $u$ $u$ into the chimney E. An air-blast, $A^3$, may also be applied to the wire bottom Z', if the natural draft should be found insufficient, the hinged doors at the bottom to be left open for natural draft, or closed for blast.

The breechings inclosing the ends of the cylinder $a$ will effectually carry off the steam and smoke given off by the coffee within the cylinder during the process of roasting, and will also carry off any smoke given off by the warm coffee which has been discharged into the receptacle Z, thereby preventing any smoke from the coffee entering into the room occupied by the workmen engaged in operating the machines.

By my construction of spiral conveyer-flanges to retain the coffee within an open-ended cylinder I dispense with the customary head or cover to the ends of the cylinder, and thus have free and ample vent at the open ends for the escape of the smoke and steam given off by the coffee within the cylinder, and I thereby avoid the necessity of perforating the side of the cylinder, and by using a closely-riveted and tightly-calked cylinder, and having the open ends extending outside the furnace, I prevent any smoke or gas from the fire from entering into the cylinder containing the coffee, and thereby make a brighter and more glossy roast than can be done when the perforated cylinder is used, and I also prevent the smoky taste given to coffee by the smoke entering the perforations of the ordinary roasting-cylinder.

By my construction of the afore-described imperforate and closely riveted and calked cylinder I am enabled to roast or dry the finest powdered materials, which cannot be done in a perforated cylinder.

By the described arrangement of the open ends of a roasting-cylinder, and consequent avoidance of opening and closing devices, I have simplified the operation of a roasting-cylinder, saving labor and the time occupied in opening and closing to discharge and refill, and the end or ends requiring no access for the purpose of emptying and refilling, I am enabled to inclose with a closed breeching to carry all smoke and odor of the roasting to the chimney, making the operation much cleaner for the operatives.

By constructing a roasting-cylinder to discharge the roasted material from the ends without access being required to said ends by the operator, I can inclose the discharging ends with a close breeching and discharging-spout, to prevent any flying ashes from the furnace or ash-pit mixing with the coffee discharged at the firing end of a roaster having both ends open, or with a roaster having but one end open I can discharge all the contents at the rear end, or end opposite to where the firing, testing, and operating the machine are performed, thereby avoiding all dust, ashes, &c., from coming in contact with the coffee, and by placing a stationary receptacle at said rear end I save the labor of placing a movable receptacle at the front end and again moving away to approach to the furnace for the purpose of firing and stoking, as is customary with all roasting-machines discharging at the front or firing end.

In constructing a roasting-cylinder having a very large diameter, the spiral conveyer-flanges $l^4$ in section $K^2$, instead of being constructed of one solid flange or spiral to fill the diameter, I prefer to construct of segments or sections $l^5$, as shown in Figs. 7 and 8, on account of the greater ease with which they may be hammered and adjusted into the proper spiral shape.

Having thus described my invention, I claim as new and desire to secure by Letters Patent—

1. A rotating coffee roasting or drying cylinder open at both ends, and having a hopper at each end, and divided into three sections, K', $K^2$, and I, the section K' provided with spiral conveyer-flanges $l'$, $l^2$, and $l^3$, and section $K^2$ provided with spiral-flange conveyers $l^4$, all conveying inwardly, and section I having the spiral flanges $j$ $j$ arranged to agitate and distribute the coffee, whereby the coffee may be conveyed through section K' or $K^2$, or through both simultaneously, held in section I by the action of the spiral flanges in sections K' and $K^2$, until sufficiently dried or roasted, and discharged at both ends by the action of flanges $j$ $j$, $l'$, $l^2$, $l^3$, and $l^4$, when the direction of rotation of the cylinder is reversed, as described.

2. A rotating coffee roasting and drying cylinder having the breechings $q'$ and $q^2$ surrounding and inclosing the entire ends of the cylinder, and extending above and below the cylinder, whereby the steam and smoke given off by the material in process of roasting or drying will be conducted through the upper portion and pipe continuations into a flue or chimney, and the coffee or other material will be discharged from the cylinder into the lower portion and spouted wherever desired, substantially as specified.

3. The combination of a rotating coffee-roasting cylinder, the stationary breechings $q'$ $q^2$, having doors $w'$ $w'$ $w^2$ $w^2$, the hopper-bottoms $p$ $p$, the spouting-tubes $y$ $y$, and the receptacle Z, whereby the smoke from the discharged hot coffee may be prevented from entering the room, and be carried into a flue or chimney, E, through the tubes and breechings, as shown and described.

4. An imperforate rotating coffee roasting or drying cylinder having one or both ends entirely open for the discharge of both the coffee and the smoke or steam at the same opening, and having located in or near said opening spiral flanges for retaining the coffee at the will of the operator without interfering with the escape of the smoke or steam, substantially as specified.

5. An open-ended roasting or drying cylinder provided with spiral conveyers leading from both open ends toward the middle, and arranged to retain the coffee or other material within the cylinder until the direction of rotation has been reversed, as described.

6. An imperforate rotating coffee roasting or drying cylinder having unclosable and non-adjustable openings at one or both ends for the automatic discharge of the material within the cylinder when rotated in a given direction, and having located in or near said openings spiral conveyers arranged to convey to or from said openings, according to the direction of rotation, substantially as shown and described.

WILLIAM H. BRUNING.

Witnesses:
JAMES T. WALKER,
ROBERT M. MILLICAN.